US009860559B2

(12) United States Patent
Zhang et al.

(10) Patent No.: US 9,860,559 B2
(45) Date of Patent: Jan. 2, 2018

(54) METHOD OF VIDEO CODING USING SYMMETRIC INTRA BLOCK COPY

(71) Applicant: MediaTek Singapore Pte. Ltd., Fusionopolis Walk (SG)

(72) Inventors: Kai Zhang, Beijing (CN); Jicheng An, Beijing (CN); Xianguo Zhang, Beijing (CN); Han Huang, Beijing (CN)

(73) Assignee: MEDIATEK Singapore Pte. Ltd., Solaris (SG)

( * ) Notice: Subject to any disclaimer, the term of this patent is extended or adjusted under 35 U.S.C. 154(b) by 364 days.

(21) Appl. No.: 14/660,196

(22) Filed: Mar. 17, 2015

(65) Prior Publication Data
US 2015/0264396 A1 Sep. 17, 2015

(51) Int. Cl.
*H04N 19/593* (2014.01)
*H04N 19/567* (2014.01)

(52) U.S. Cl.
CPC ......... *H04N 19/593* (2014.11); *H04N 19/567* (2014.11)

(58) Field of Classification Search
None
See application file for complete search history.

(56) References Cited

U.S. PATENT DOCUMENTS

| | | | | |
|---|---|---|---|---|
| 9,264,713 B2* | 2/2016 | Joshi | ...................... | H04N 19/88 |
| 2005/0243920 A1* | 11/2005 | Murakami | ............. | H04N 19/44 |
| | | | | 375/240.12 |
| 2007/0036226 A1* | 2/2007 | Kim | ...................... | H04N 19/105 |
| | | | | 375/240.24 |
| 2015/0071357 A1* | 3/2015 | Pang | ...................... | H04N 19/593 |
| | | | | 375/240.16 |
| 2016/0277761 A1* | 9/2016 | Li | ........................ | H04N 19/124 |
| 2017/0070748 A1* | 3/2017 | Li | ........................ | H04N 19/176 |

OTHER PUBLICATIONS

Dai, Yunyang, "Efficient Block-Based Intra Prediction for Image Coding with 2D Geometrical Manipulations", 15th IEEE International Conference on Image Processing, (2008).*
Dai, Yunyang, et al., "Efficient Block-Based Intra Prediction for Image Coding with 2D Geometrical Manipulations", 15th IEEE International Conference on Image Processing (2008).*

* cited by examiner

*Primary Examiner* — William C Vaughn, Jr.
*Assistant Examiner* — Lindsay Uhl
(74) *Attorney, Agent, or Firm* — Wolf, Greenfield & Sacks, P.C.

(57) ABSTRACT

A method and apparatus for video coding including an IntraBC (Intra-block copy) mode for a picture according to the present invention is disclosed. Embodiments of the present invention take advantage of pattern symmetry in screen contents as well as natural video to improve the performance of IntraBC coding. Accordingly, at least a reference block is reformed to generate a reformed predictor and IntraBC coding is applied to a block using the reformed predictor. Reforming the reference block may correspond to applying a reforming operation selected from a reforming group to the reference block, where the reforming group consists of horizontal flipping, vertical flipping, horizontal and vertical flipping, clockwise rotation, counter-clockwise rotation and transposition.

19 Claims, 8 Drawing Sheets

METHOD OF VIDEO CODING USING SYMMETRIC INTRA BLOCK COPY

CROSS REFERENCE TO RELATED APPLICATIONS

The present invention claims priority to PCT Patent Application, Serial No. PCT/CN2014/073526, filed on Mar. 17, 2014 and PCT Patent Application, Serial No. PCT/CN2014/077862), filed on May 20, 2014. The PCT Patent Applications are hereby incorporated by reference in their entireties.

FIELD OF THE INVENTION

The present invention relates to video coding using Intra-block copy (IntraBC) mode. In particular, the present invention relates to techniques to improve the performance of the Intra-block copy (IntraBC) coding mode for screen content coding or video coding.

BACKGROUND AND RELATED ART

In the current development of range extension (RExt) or screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC Range Extension and screen content coding, a new Intra coding mode, named Intra-block copy (IntraBC or IBC) has been used. The IntraBC technique that was originally proposed by Budagavi in AHG8: *Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV) or block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

While IntraBC has been found to be a useful coding tool to improve performance particularly for screen contents, it is desirable to develop methods to further improve the performance.

BRIEF SUMMARY OF THE INVENTION

A method and apparatus for video coding including an IntraBC (Intra-block copy) mode for a picture according to the present invention is disclosed. Embodiments of the present invention take advantage of pattern symmetry in screen contents as well as natural video to improve the performance of IntraBC coding. Accordingly, at least a reference block is reformed to generate a reformed predictor and IntraBC coding is applied to a block using the reformed predictor. The reference block can be located in the current picture or in a reference picture reconstructed before the current picture. The location of the reference block in the current picture can be identified according to a block vector (BV) and the location of the current block. The location of the reference block in the reference picture reconstructed can be identified according to a motion vector (MV) and the location of the current block.

Reforming the reference block may correspond to applying a reforming operation selected from a reforming group to the reference block, where the reforming group consists of horizontal flipping, vertical flipping, horizontal and vertical flipping, clockwise rotation, counter-clockwise rotation and transposition. Reforming the reference block may also correspond to applying two or more reforming operations sequentially to the reference block. Furthermore, reforming the reference block may correspond to applying an arbitrary reforming operation to the reference block, where a reference sample of the reference block, $R(x,y)$ is reformed to a predictor sample of the reformed predictor, $R'(x,y)$ according to $R'(x,y)=R(f(x,y), g(x,y))$, where f and g are two functions and x and y are coordinates for the reference block and the reformed predictor. One of f and g, or both f and g may depend on x only, y only, or both. One of f and g, or both f and g may also depend on size, width, height, shape or coding mode of the current block or the reference block. Furthermore, one of f and g, or both f and g may depend on the type of the current picture, a reference picture or a slice. Functions f and g can be a linear or non-linear function.

The method may comprise signaling control information from an encoder to a decoder regarding whether to use the reformed predictor or which type of reforming operation for the current block. The control information can be signaled in a macro-block (MB), a coding tree unit (CTU), a coding unit (CU), a transform unit (TU) or a prediction unit (PU) level. The control information can be signaled using context adaptive binarized arithmetic coding (CABAC). The context model for the CABAC may comprise the control information associated with neighboring blocks of the current block. Control information regarding whether to use the reformed predictor or which type of reforming operation for the current block can also be inferred at a decoder side without explicitly signaling the control information. The control information regarding whether to use the reformed predictor or which type of reforming operation for the current block can be dependent on the size, shape, coding mode, motion vector or block vector information of the current block.

The IntraBC with pattern symmetry can be applied to all color components jointly, individual colors or depth data. In other words, the current block can be associated with all color components, an individual color component or depth data of the current picture. If the current block and the reference block are in a same vertical location in the current picture and the reformed predictor is applied to the current block, the reference block is horizontally flipped before it is used as a predictor for the current block. Similarly, if the current block and the reference block are in a same horizontal location in the current picture and the reformed predictor is applied to the current block, the reference block is vertically flipped before it is used as a predictor for the current block.

Another aspect of the present invention addresses block vector (BV) derivation for IntraBC with pattern symmetry. In one embodiment, a BV predictor is utilized during a two-stage BV derivation. A first group of BV candidates for a current block are determined in a first step, where the first group of BV candidates consists of original first BV candidates associated with first un-reformed luma reference blocks and first symmetric BV candidates associated with first reformed symmetric luma reference blocks. A second group of BV candidates is determined from the first group of BV candidates for the current block in a second step using information including a chroma component. The second group of BV candidates consists of second original BV candidates associated with second un-reformed reference blocks and second symmetric BV candidates associated with second reformed symmetric reference blocks. If the BVP belongs to the first group of BV candidates, the BVP is included in the second group of BV candidates. An optimal BV for the current block is then selected from the second group of BV candidates and the optimal BV is used to locate a reference block for IntraBC coding. The second group of BV candidates is determined from the first group of BV based on a hash number calculated based on the chroma component. The hash number is calculated from characteristics of the chroma components comprising a mean value or gradient. The distortion between the chroma component of the current block and the chroma component of a reference block associated with each of the second group of BV candidates can be used to select the optimal BV if two BV candidates in the second group have a same hash number.

DETAILED DESCRIPTION OF THE INVENTION

Figure 2:
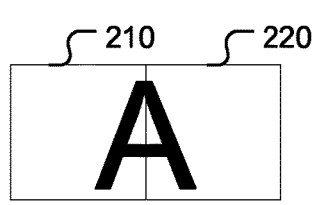
FIG. 2 illustrates an example of horizontal symmetry in the reference blocks.
Figure 3:
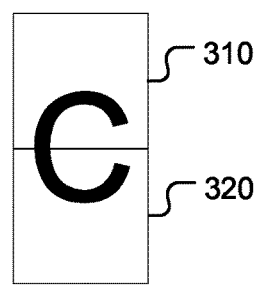
FIG. 3 illustrates an example of vertical symmetry in the reference blocks.
Figure 4:
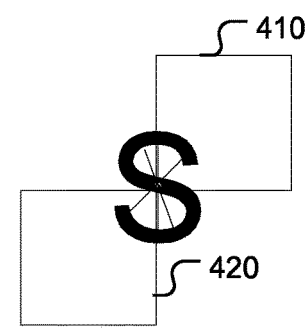
FIG. 4 illustrates an example of rotational symmetry or centrosymmetry in the reference blocks.

One key idea behind the Intra Block Copy (IntraBC) is that a same or similar block patterns may appear in different locations in a picture, particularly for a picture corresponding to screen contents. It has been observed that, beside duplicated patterns in a picture, symmetric patterns also often appear in screen-content pictures as well as natural images. FIG. 2 illustrates an example of horizontal symmetry, where block 210 and block 220 correspond to a horizontal mirror image of each other. FIG. 3 illustrates an example of vertical symmetry, where block 310 and block 320 correspond to a vertical mirror image of each other. FIG. 4 illustrates an example of rotational symmetry or centrosymmetry, where symmetry is found for any radial lines passing through the center point. For example, block 410 and block 420 are rotationally symmetric.

Figure 5:
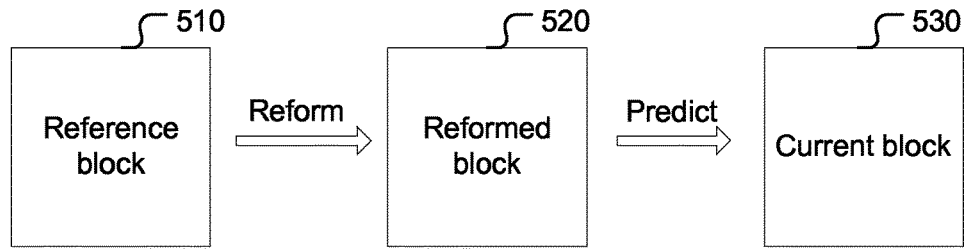
FIG. 5 illustrates an example of generating a reformed block from a reference block and using the reformed block as a predictor for the current block according to the present invention.

In order to exploit the symmetry of patterns for improving the performance, several reformed block copying (RC) methods are disclosed in this application. In the RC methods, a reference block (510) is reformed first to generate a reformed block (520), and then the reformed block is used to predict the current block (530), as shown in FIG. 5.

Figure 6:
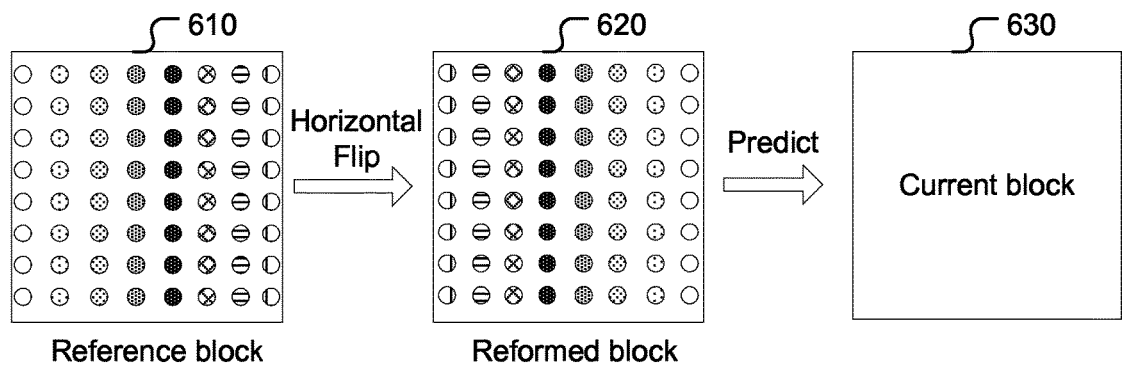
FIG. 6 illustrates an example of horizontally flipping a reference block to generate a reformed block for predicting the current block.

In one embodiment, a reference block is horizontally flipped to generate a reformed block before it is used to predict the current block. An example of horizontally flipping a reference block (610) to generate a reformed block (620) for predicting the current block (630) is shown in FIG. 6. The reference block can be in the same picture or in a different picture of the current block. An exemplary flipping process is described as follows. If the width of the reference block is W, R(x,y) is a sample in the reference block with x from 0 to W−1. A sample R'(x,y) in the horizontally flipped reference block (i.e., the reformed block) can be derived as R'(x,y)=R(W−1−x,y).

Figure 7:
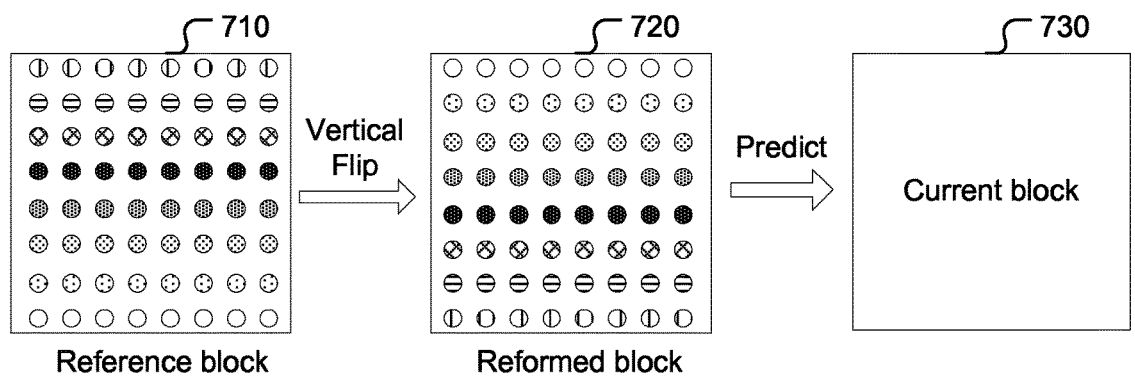
FIG. 7 illustrates an example of vertically flipping a reference block to generate a reformed block for predicting the current block.

In another embodiment, a reference block is vertically flipped to generate a reformed block before it is used to predict the current block. An example of vertically flipping a reference block (710) to generate a reformed block (720) for predicting the current block (730) is shown in FIG. 7. The reference block can be in the same picture or in a different picture of the current block. An exemplary flipping process is described as follows. If the height of the reference block is H, R(x,y) is a sample in the reference block with y from 0 to H−1. A sample R'(x,y) in the flipped reference block can be derived as R'(x,y)=R(x, H−1−y).

Figure 8:
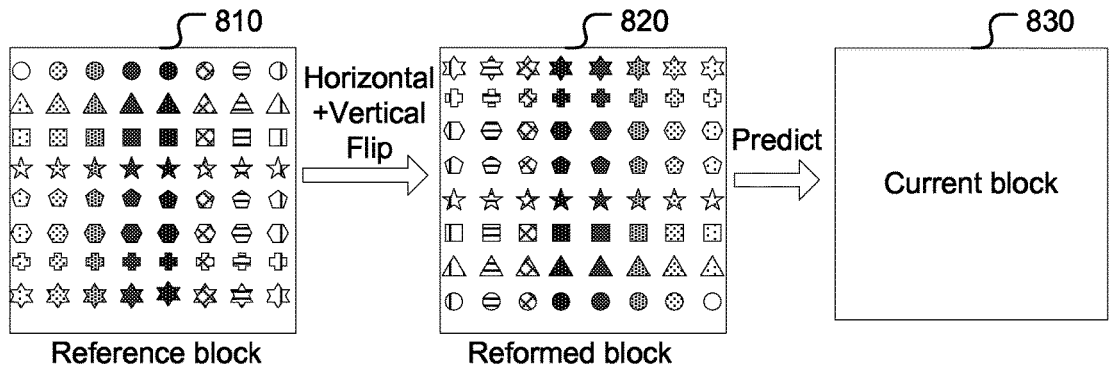
FIG. 8 illustrates an example of vertically flipping and then horizontally flipping a reference block to generate a reformed block for predicting the current block.

In still another embodiment, a reference block (810) is vertically flipped then horizontally flipped, or horizontally flipped then vertically flipped to generate a reformed block (820) before it is used to predict the current block (830), as shown in FIG. 8. The reference block can be in the same picture or in a different picture of the current block. An exemplary flipping process is described as follows. If the width of the reference block is W and the height of the reference block is H, and R(x,y) is a sample in the reference block with x from 0 to W−1 and y from 0 to H−1. A sample R'(x,y) in the vertically and horizontally flipped reference block can be derived as R'(x,y)=R(W−1−x, H−1−y). It is noted that original pattern and the vertically and horizontally flipped pattern are rotationally symmetric.

Figure 9:
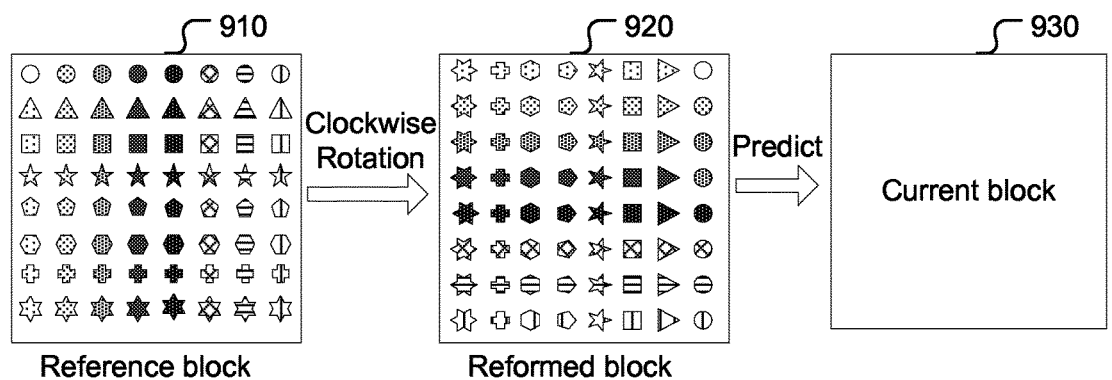
FIG. 9 illustrates an example of rotating a reference block clockwise to generate a reformed block for predicting the current block.

In still another embodiment, a reference block (910) is rotated clockwise to generate a reformed block (920) before it is used to predict the current block (930), as shown in FIG. 9. The reference block can be in the same picture or in a different picture of the current block. An exemplary clockwise rotation process is described as follows. If the height of the reference block is H, and R(x,y) is a sample in the reference block with y from 0 to H−1, then a sample R'(x,y) in the clockwise rotated reference block can be derived as R'(x,y)=R(H−1−y, x).

Figure 10:
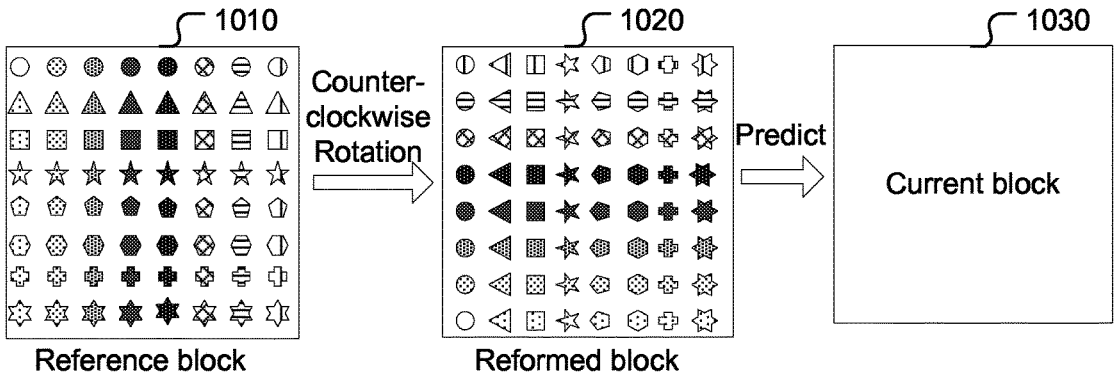
FIG. 10 illustrates an example of rotating a reference block counter-clockwise to generate a reformed block for predicting the current block.

In still another embodiment, a reference block (1010) is rotated counter clockwise to generate a reformed block (1020) before it is used to predict the current block (1030), as shown in FIG. 10. The reference block can be in the same picture or in a different picture of the current block. An exemplary counter clockwise rotation process is described as follows. If the width of the reference block is W, and R(x,y) is a sample in the reference block with x from 0 to W−1, then a sample R'(x,y) in the rotated reference block can be derived as R'(x,y)=R(y, W−1−x).

Figure 11:
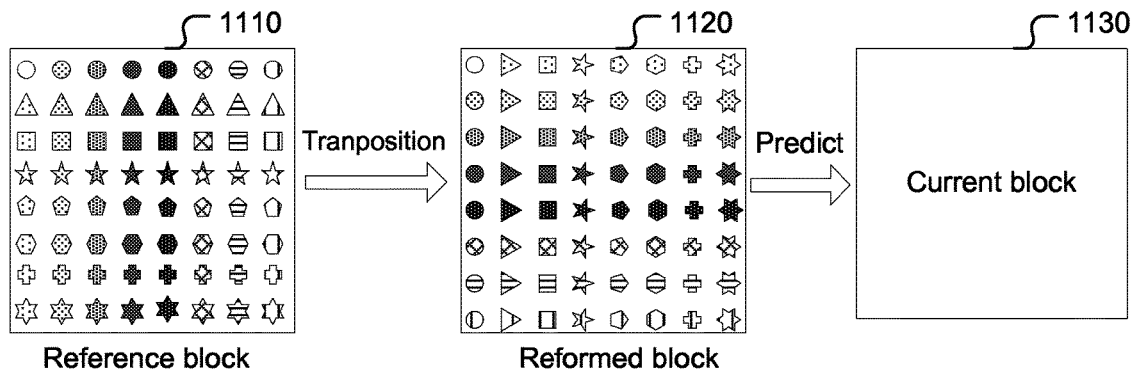
FIG. 11 illustrates an example of transposing a reference block to generate a reformed block for predicting the current block.

In still another embodiment, a reference block (1110) is transposed to generate a reformed block (1120) before it is used to predict the current block (1130), as shown in FIG. 11. The reference block can be in the same picture or in a different picture of the current block. An exemplary transposition process is described as follows. If R(x,y) is a sample in the reference block, then a sample R'(x,y) in the transposed reference block can be derived as R'(x,y)=R(y,x).

In still another embodiment, a reference block is reformed arbitrarily before it is used to predict the current block. The reference block can be in the same picture or in a different picture of the current block. An exemplary transformation process is described as follows. If R(x,y) is a sample in the reference block, then a sample R'(x,y) in the reformed reference block can be derived as R'(x,y)=R(f(x,y), g(x,y)), where f and g are any functions. Functions f and g can depend on x only, y only, or both. Functions f and g can depend on the size, width, height, shape or coding mode of the current block or the reference block. Functions f and g can also depend on the type of the current or reference picture or slice. Functions f and g can be a linear or non-linear function. Furthermore, in the above options, functions f and g can be the same or different.

Figure 12:
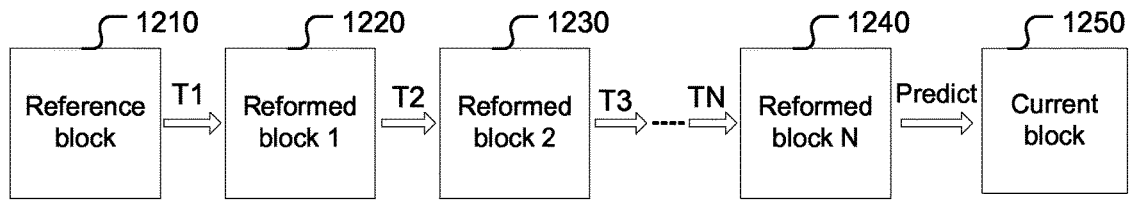
FIG. 12 illustrates an example of sequential reforms, where a reference block is reformed into various reformed blocks sequentially before it is used by the current block.

In still another embodiment, a reference block is reformed by a combination of two or more reforming methods, such as horizontal flipping, vertical flipping, clockwise rotation, counter clockwise rotation, transposition and any arbitrary reforms. The reforms can be done in a cascade manner, where a reference block is reformed sequentially before it is used to predict the current block. FIG. 12 illustrates an example of sequential reforms, where a reference block (1210) is reformed into various reformed blocks (1220 through 1240) by applying the reforming methods T1 to TN before it is used by the current block (1250). The output from a previous-stage reform is treated as the input to a next-stage reform.

In still another embodiment, an encoder can decide whether to apply reformed block copying or not for a block and signal the information to the decoder. The information can be signaled for a macro-block (MB), a coding tree unit (CTU) a coding unit (CU), a transform unit (TU) or a prediction unit (PU). The encoder can make the decision based on the rate-distortion optimization (RDO) criterion or other criterions. An encoder may also decide to apply which type of reformed block copying for a block and signal the information to the decoder. The information can be signaled in a macro-block (MB), a coding tree unit (CTU), a coding unit (CU), a transform unit (TU) or a prediction unit (PU) level. The encoder can make the decision based on the rate-distortion optimization (RDO) criterion or other criterions.

Instead of using information signaled by the encoder, a decoder may infer whether to apply reformed block copying or not for a block implicitly. Therefore, there is no need for the encoder to signal explicitly. Similarly, a decoder may also infer which type of reformed block copying for a block implicitly. Therefore, there is no need for the encoder to signal which type of reformed block copying is applied explicitly. The reformed block copying methods can be applied to Inter block copying, motion compensation, or Intra block copying.

The reformed block copying methods can be applied to a block with size M×N, where M and N are arbitrary positive integers. M and N can be the same or different. For example, M can be equal to a*N, where a is a positive integer equal or larger than 2. N can be equal to b*M, where b is a positive integer equal or larger than 2. In another example, M or N are 1.

The reformed block copying methods can be applied to all color components in an image. For example, it can be applied to YUV or RGB components. The reformed block copying methods can also be applied to the depth component for 3D video/image coding. Furthermore, the reformed block copying methods can be done separately for each color component to decide whether to apply reformed block copying or not and signal this information for a block. Alternatively, all components can be treated in the same manner and only single information is signaled for a block. The reformed block copying methods can be done separately for each component to decide which type of reformed block copying is applied and this information is signaled for a block. Alternatively, all components can be treated in the same manner and only single information is signaled for a block.

Instead of using information signaled by the encoder, the reformed block copying methods can be done separately for each component to infer whether to apply reformed block copying or not for a block at the decoder implicitly. Alternatively, all components can be treated in the same manner for a block. Similarly, the reformed block copying methods can be done separately for each component to infer which type of reformed block copying is applied to a block at the decoder implicitly. Alternatively, all components can be treated in the same manner for a block.

The reformed block copying methods may depend on the size, shape or coding mode of the current block or the current CU\TU\PU to decide or infer whether to apply reformed block copying or not. The reformed block copying methods may depend on the size, shape or coding mode of the current block or the current CU\TU\PU to decide or infer which type of reformed block copying is applied. The reformed block copying methods may also depend on BVs or MVs of the current block in Intra block copying to decide or infer whether to apply reformed block copying or not, or which type of reformed block copying to apply.

In one embodiment, the reference block is horizontally flipped before it is used for prediction if the reformed block copying is used in the current block, and the reference block and the current block possess the same vertical position. In other words, they component of the BV for the current block is 0. Similarly, the reference block can be vertically flipped before it is used for prediction if the reformed block copying is used in the current block, and the reference block and the current block possess the same horizontal position. In other words, the x component of the BV for the current block is 0.

The reformed block copying can be allowed only for CU with Intra block copying mode or with partition size 2N×2N.

In still another embodiment, a flag can be coded by context adaptive binarized arithmetic coding (CABAC) for a CU, TU or PU to indicate whether the reformed block copying is used for the current block. The flags in its neighboring blocks can be used to determine the context model to code the flag for the current block. The flag is treated as default value (e.g., 0 or 1) if it is not signaled.

In still another embodiment, the BVs or MVs for the current block are coded in the same way as the case where the reformed block copying is used or not used for the current block. The BVs or MVs for the current block may also be coded differently for the cases when reformed block copying is used and not used for the current block.

Figure 1:
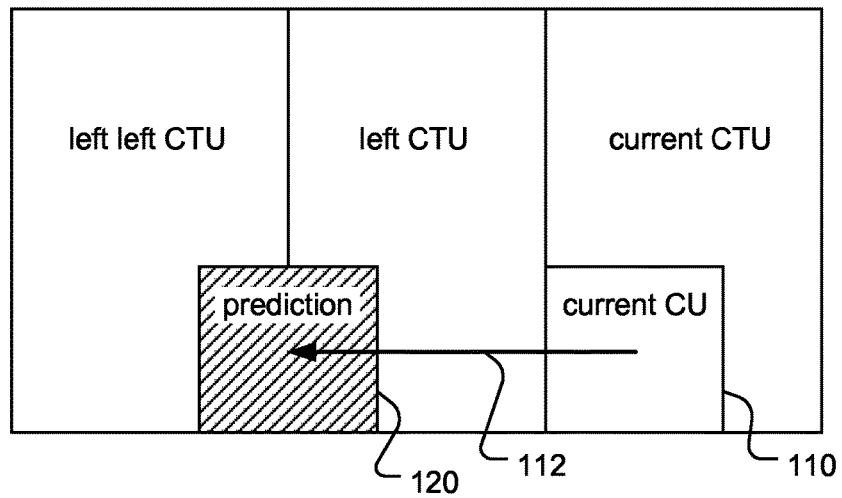
FIG. 1 illustrates an example of Intra motion compensation according to the Intra-block copy (IntraBC) mode, where a horizontal displacement vector is used.

As mentioned before, the Intra block copy process requires deriving a block vector (BV) to locate a reference block for predicting a current block. While FIG. 1 illustrates an example of one-dimensional horizontal BV, systems utilize two-dimensional BV has also been disclosed during the HEVC standard development. It is well known that motion estimation process for determining an optimal motion vector (MV) for inter-prediction is very time-consuming. Similarly, determining an optimal block vector (BV) is also time-consuming.

Several advanced methods of BV derivation have been adopted into SCM1.0 software (Screen Content Coding Test Model version 1.0). For example, a two-step search method has been disclosed by Pang et al., in JCTVC-Q0175 (Pang et al., *Intra block copy with encoder search using chroma component*, Joint Collaborative Team on Video Coding (JCT-VC) of ITU-T SG 16 WP 3 and ISO/IEC JTC 1/SC 29/WG 11 17th Meeting: Valencia, ES, 27 Mar.-4 Apr. 2014, Document: JCTVC-Q0175). In the first step, only the Luma components are involved in the sum of absolute difference (SAD) calculation for determining the best BVs. Based on the SAD, the best N BVs (e.g., N=4 in JCTVC-Q0175) in the first step are chosen as candidates for the second step. In the second step, Chroma components along with Luma component are involved in the SAD calculation. The best one among the N candidates is determined as the optimal BV for the current block.

Another BV derivation has been disclosed by Rapaka, et al., in JCTVC-Q0248 (Rapaka, et al., *Software for SCM with hash-based motion search*, Joint Collaborative Team on Video Coding (JCT-VC) of ITU-T SG 16 WP 3 and ISO/IEC JTC 1/SC 29/WG 11 17th Meeting: Valencia, ES, 27 Mar.-4 Apr. 2014, Document: JCTVC-Q0248), where a hash based fast searching algorithm is used. In this method, a hash number is calculated for a block based on its characteristics. The hash numbers for reference blocks with possible BVs are pre-calculated. When coding the current block, the hash number of the current block is calculated and BVs with the same hash block are chosen as candidates. Traditional searching methods, such as SAD or rate distortion optimization (RDO) criterion are then applied on these candidates to find the optimal one.

While these advanced methods of BV derivation improve the system performance, however, there are some issues with these advanced methods of BV derivation. For example, while both luma and chroma components are used in JCTVC-Q0175, the hash-based method of JCTVC-Q0248 does not rely on the chroma component for the hash calculation. The method of JCTVC-Q0248 does not rely on the chroma component for the SAD calculation either. Furthermore, these two methods are not compatible with the symmetrical Intra block copy disclosed above. In order to overcome the issue, methods are disclosed herein to improve the Intra-block copy searching process.

Figure 13:
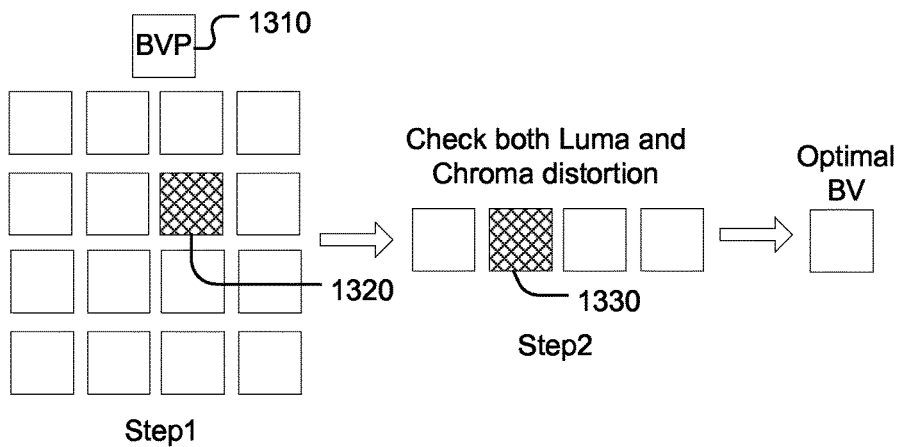
FIG. 13 illustrates an example of block vector derivation including checking the block vector predictor (BVP) of the current block in the first step of the two-step searching.

In one embodiment, a block vector predictor (BVP) of the current block is checked against the BV candidates in the first step of the two-step searching approach as shown in FIG. 13. If BVP (1310) is one of the N best BVs indicated by reference number 1320 in the first step, it will be chosen as a candidate (1330) to the second step. The BVP can be derived based on some known techniques in the field. For example, the BVP can be derived based on the BVs associated with neighboring blocks of the current block. In another embodiment, chroma components are involved in the process of calculating the hash number. Furthermore, characteristics of chroma components such as the mean value and gradient are calculated to constitute a hash number.

In another embodiment, when coding the current block, the hash number of the current block can be calculated and BVs with the same hash block are chosen as candidates. Distortions of chroma components can be calculated for these candidates and will be used to determine the optimal BV.

Figure 14:
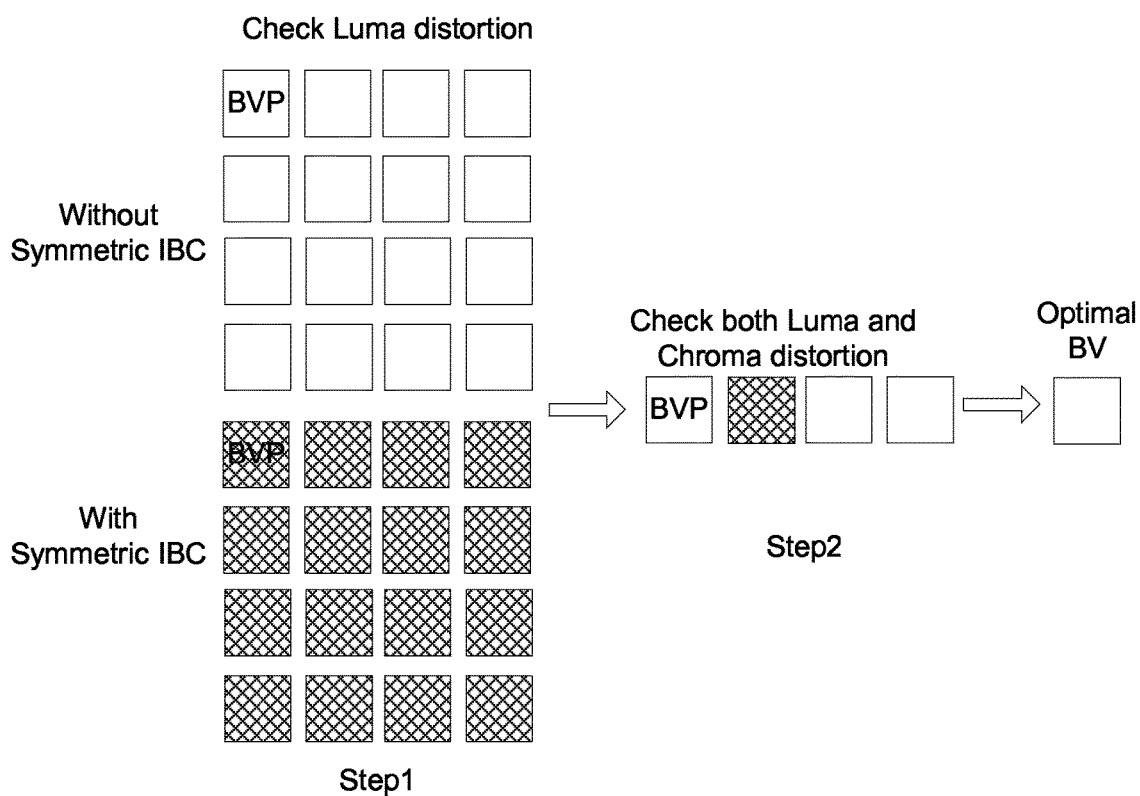
FIG. 14 illustrates an example of block vector derivation by taking into consideration of pattern symmetry of the reference blocks.

In still another embodiment, different symmetric IBC (i.e., IntraBC) types as well as the original IBC associated with a BV are checked as different candidates in the first step in the two-step approach as shown in FIG. 14. For example, if the searching range corresponds to $\{BV_i\}$ with i from 0 to 15 and horizontal symmetric IBC is enabled, then each $BV_i$ will be checked twice with symmetric IBC on and off in the first step. There will be 32 candidates in the first step as shown in FIG. 14. The best N candidates including the BV and symmetric IBC information are chosen as the candidates for the second step. In the second step, distortions of chroma components associated with the candidate are calculated and used to determine whether to use symmetric IBC or which symmetric IBC to apply to the luma and chroma components. In still another embodiment, the BVP of the current block with different symmetric IBC types as well as the original IBC can be checked as different candidates in the first step of the two-step approach.

Figure 15:
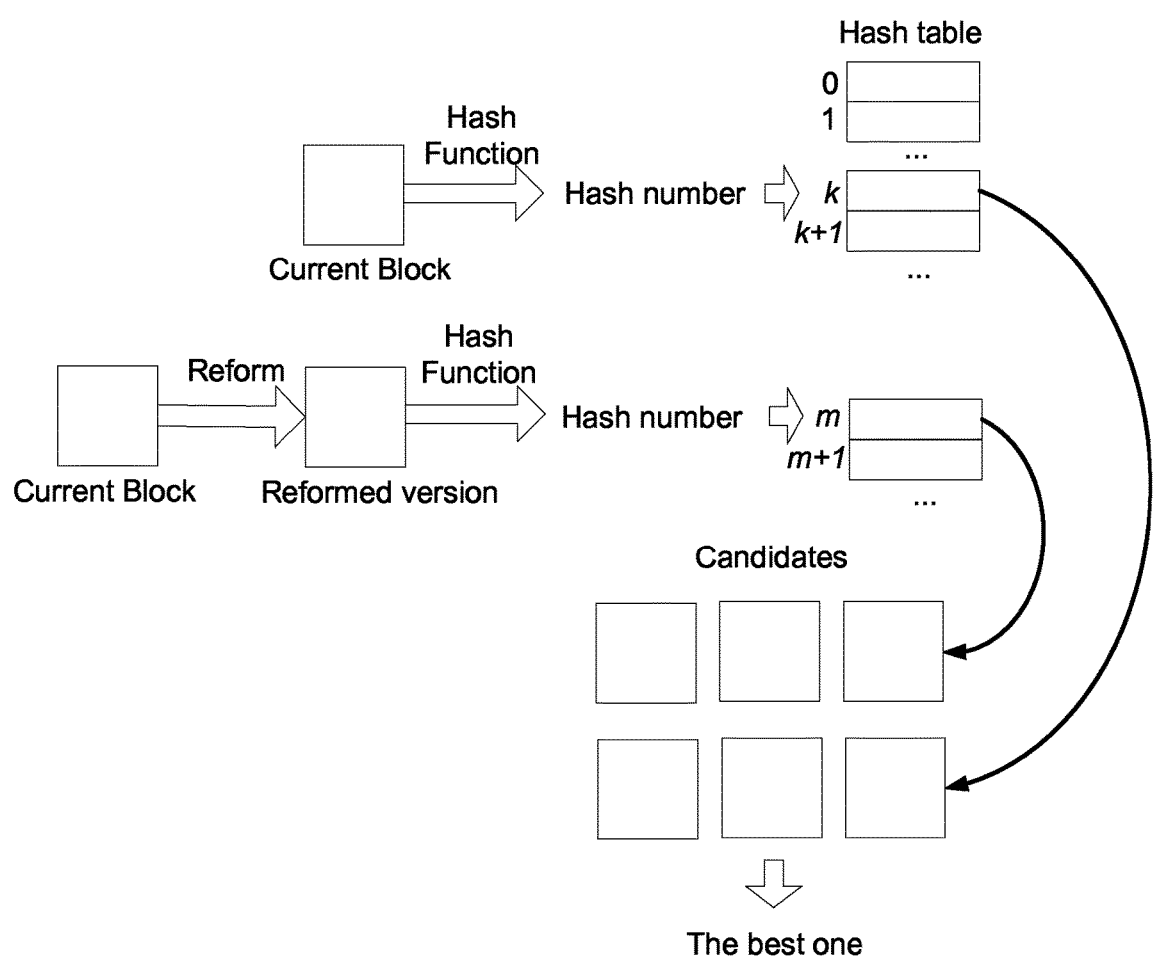
FIG. 15 illustrates an example of block vector derivation using hash number determined for a chroma component.

In still another embodiment, symmetric IBC is considered in the hash-based searching process as shown in FIG. 15. When symmetric IBC is checked, a reformed version of the current block is used to calculate a hash number. BVs with the same hash block are chosen as candidates. Distortions for these candidates are calculated between the reference block and the reformed version of the current block. As for reforming, the current block can be horizontally flipped or vertically flipped.

The performance of a system incorporating an embodiment of the present invention is compared to an anchor system based of SCM1.0 software (Screen Content Coding Test Model version 1.0). The system incorporating an embodiment of the present invention allows both vertical and horizontal symmetry for the reformed reference blocks. The test is conducted under common test condition (CTC) for screen content coding (SCC) with the full picture IBC search range. The performance comparisons in terms of BD-Rate are summarized as follows for different test materials, where the BD-Rate is a well-known performance measure in the field of video coding. A negative value indicates the system according to the present invention outperforming the anchor system.

Figure 16:
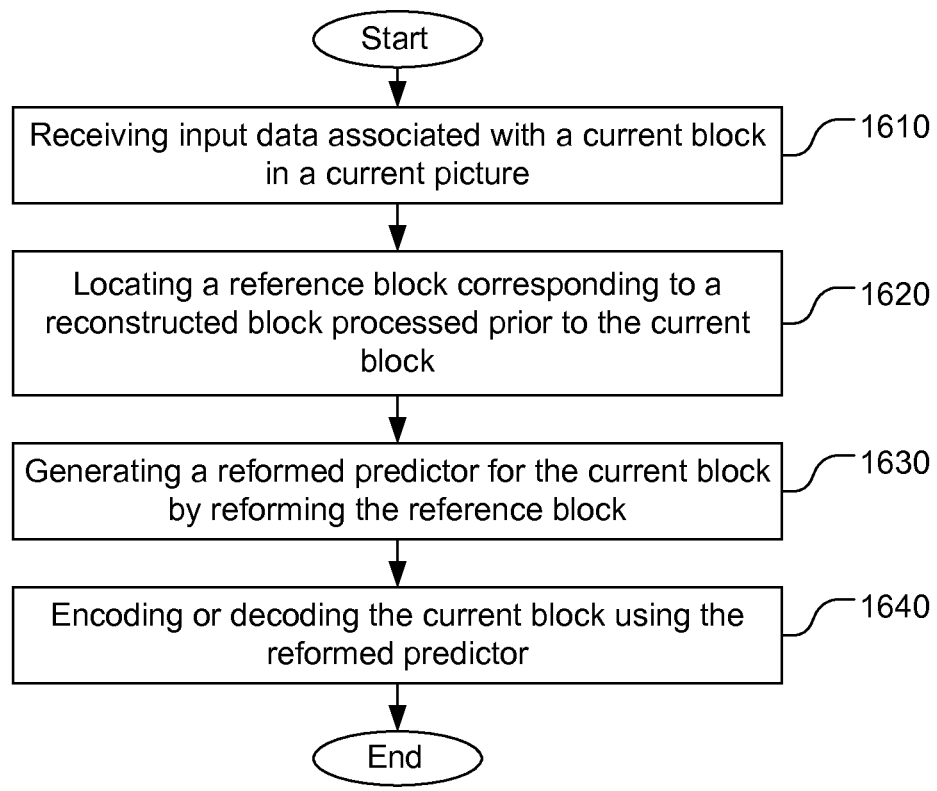
FIG. 16 illustrates an exemplary flowchart for IntraBC coding utilizing pattern symmetry for predicting a current block according to an embodiment of the present invention.

- −1.3% for RGB, text & graphics with motion, 1080p
- −0.8% for RGB, text & graphics with motion, 720p
- −1.0% for RGB, mixed content, 1440p
- −0.8% for RGB, mixed content, 1080p
- −1.2% for YUV, text & graphics with motion, 1080p
- −0.9% for YUV, text & graphics with motion, 720p
- −1.0% for YUV, mixed content, 1440p
- −0.8% for YUV, mixed content, 1080p FIG. 16 illustrates an exemplary flowchart for IntraBC coding utilizing pattern symmetry for predicting a current block according to an embodiment of the present invention. The system receives input data associated with a current block in a current picture as shown in step 1610. For encoding, the input data corresponds to pixel data or depth data to be encoded. For decoding, the input data corresponds to coded pixel data or depth data to be decoded. The input data may be retrieved from memory (e.g., computer memory, buffer (RAM or DRAM) or other media) or from a processor. A reference block corresponding to a reconstructed block processed prior to the current block is located as shown in step 1620. A reformed predictor is generated for the current block by reforming the reference block as shown in step 1630. Encoding or decoding is applied to the current block using the reformed predictor as shown in step 1640.

Figure 17:
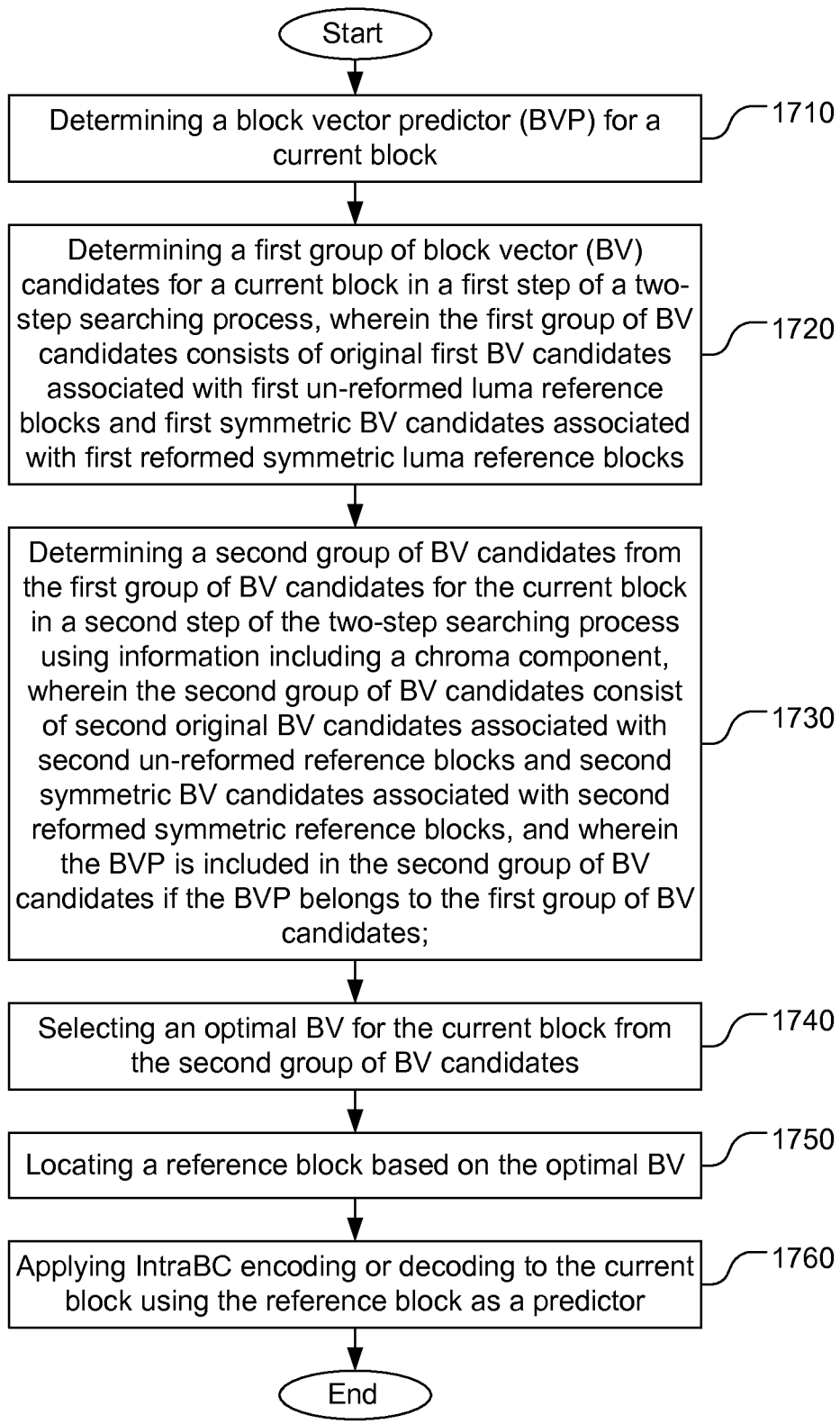
FIG. 17 illustrates an exemplary flowchart for IntraBC coding, where the block vector (BV) derivation utilizes a BV predictor and takes into consideration of pattern symmetry according to an embodiment of the present invention.

FIG. 17 illustrates an exemplary flowchart for IntraBC coding, where the block vector (BV) derivation utilizes a BV predictor and takes into consideration of pattern symmetry according to an embodiment of the present invention. A block vector predictor (BVP) is determined for a current block in step 1710. A first group of block vector (BV) candidates is determined for a current block in a first step of a two-step searching process as shown in step 1720, where the first group of BV candidates consists of original first BV candidates associated with first un-reformed luma reference blocks and first symmetric BV candidates associated with first reformed symmetric luma reference blocks. A second group of BV candidates is determined from the first group of BV candidates for the current block in a second step of the two-step searching process using information including a chroma component as shown in step 1730. The second group of BV candidates consist of second original BV candidates associated with second un-reformed reference blocks and second symmetric BV candidates associated with second reformed symmetric reference blocks. The BVP is included in the second group of BV candidates if the BVP belongs to the first group of BV candidates. An optimal BV is selected for the current block from the second group of BV candidates in step 1740 and a reference block is located based on the optimal BV in step 1750. IntraBC encoding or decoding is then to the current block using the reference block as a predictor in step 1760.

The flowcharts shown above are intended to illustrate an example of inter-view motion prediction for depth data according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding including an IntraBC (Intra-block copy) mode for a picture, the method comprising:
   receiving input data associated with a current block in a current picture;
   locating a reference block corresponding to a reconstructed block processed prior to the current block;
   generating a reformed predictor for the current block by reforming the reference block; and
   encoding or decoding the current block using the reformed predictor,
   wherein reforming the reference block corresponds to at least one of:
   applying two or more reforming operations sequentially to the reference block, wherein each reforming operation is selected from a reforming group consisting of horizontal flipping, vertical flipping, horizontal and vertical flipping, clockwise rotation, counter-clockwise rotation and transposition; and
   applying an arbitrary reforming operation to the reference block, wherein a reference sample of the reference block, R(x,y) is reformed to a predictor sample of the reformed predictor, R'(x,y) according to R'(x,y)=R(f(x, y), g(x,y)), wherein f and g are two functions and x and y are coordinates for the reference block and the reformed predictor, wherein one of f and g or both f and g depend on size, width, height, shape or coding mode of the current block or the reference block.

2. The method of claim 1, wherein the reference block is located in the current picture or in a reference picture reconstructed before the current picture.

3. The method of claim 2, wherein a location of the reference block in the current picture is identified according to a block vector (BV) and the location of the current block, or the location of the reference block in the reference picture reconstructed is identified according to a motion vector (MV) and the location of the current block.

4. The method of claim 1, wherein said reforming the reference block corresponds to applying a reforming operation selected from a reforming group to the reference block, wherein the reforming group consists of horizontal flipping, vertical flipping, horizontal and vertical flipping, clockwise rotation, counter-clockwise rotation and transposition.

5. The method of claim 1, wherein said reforming the reference block corresponds to applying two or more reforming operations sequentially to the reference block, wherein each reforming operation is selected from a reforming group consisting of horizontal flipping, vertical flipping, horizontal and vertical flipping, clockwise rotation, counter-clockwise rotation and transposition.

6. The method of claim 1, wherein one of one of f and g or both f and g depend on x only, y only, or both.

7. The method of claim 1, wherein one of f and g or both f and g depend on size, width, height, or shape of the current block or the reference block.

8. The method of claim 1, wherein one of f and g or both f and g depend on a type of the current picture, a reference picture or a slice.

9. The method of claim 1, wherein one of f and g or both f and g are a linear or non-linear function.

10. The method of claim 1, further comprising signaling control information from an encoder to a decoder regarding whether to use the reformed predictor or which type of reforming operation for the current block.

11. The method of claim 10, wherein the control information is signaled in a macro-block (MB), a coding tree unit (CTU), a coding unit (CU), a transform unit (TU) or a prediction unit (PU) level.

12. The method of claim 10, wherein the control information is signaled using context adaptive binarized arithmetic coding (CABAC).

13. The method of claim 12, wherein a context model for the CABAC comprises the control information associated with neighboring blocks of the current block.

14. The method of claim 1, wherein control information regarding whether to use the reformed predictor or which type of reforming operation for the current block is inferred at a decoder side without explicitly signaling the control information.

15. The method of claim 1, wherein control information regarding whether to use the reformed predictor or which type of reforming operation for the current block depends on size, shape, coding mode, motion vector or block vector information of the current block.

16. The method of claim 1, wherein the current block is associated with all color components, an individual color component or depth data of the current picture.

17. The method of claim 1, wherein said reforming the reference block corresponds to horizontally flipping the reference block if the reformed predictor is applied to the current block, and the current block and the reference block are in a same vertical location in the current picture.

18. The method of claim 1, wherein said reforming the reference block corresponds to vertically flipping the reference block if the reformed predictor is applied to the current block, and the current block and the reference block are in a same horizontal location in the current picture.

19. An apparatus for video coding including an IntraBC (Intra-block copy) mode for a picture, the apparatus comprising one or more electronic circuits configured to:
receive input data associated with a current block in a current picture;
locate a reference block corresponding to a reconstructed block processed prior to the current block;
generate a reformed predictor for the current block by reforming the reference block; and
encode or decode the current block using the reformed predictor,
wherein reforming the reference block corresponds to at least one of:
applying two or more reforming operations sequentially to the reference block, wherein each reforming operation is selected from a reforming group consisting of horizontal flipping, vertical flipping, horizontal and vertical flipping, clockwise rotation, counter-clockwise rotation and transposition; and
applying an arbitrary reforming operation to the reference block, wherein a reference sample of the reference block, R(x,y) is reformed to a predictor sample of the reformed predictor, R'(x,y) according to R'(x,y)=R(f(x, y), g(x,y)), wherein f and g are two functions and x and y are coordinates for the reference block and the reformed predictor, wherein one of f and g or both f and g depend on size, width, height, shape or coding mode of the current block or the reference block.

* * * * *

UNITED STATES PATENT AND TRADEMARK OFFICE
CERTIFICATE OF CORRECTION

PATENT NO. : 9,860,559 B2  
APPLICATION NO. : 14/660196  
DATED : January 2, 2018  
INVENTOR(S) : Kai Zhang et al.

Page 1 of 1

It is certified that error appears in the above-identified patent and that said Letters Patent is hereby corrected as shown below:

On the Title Page

Amend to list the Foreign Application Priority Data:
PCT/CN2014/073526, filed on March 17, 2014; and
PCT/CN2014/077862, filed on May 20, 2014.

Signed and Sealed this
Eighth Day of May, 2018

Andrei Iancu
*Director of the United States Patent and Trademark Office*